P. McINTYRE.
Improvement in Molds for Clay and Cement Pipes.
No. 132,168. Patented Oct. 15, 1872.
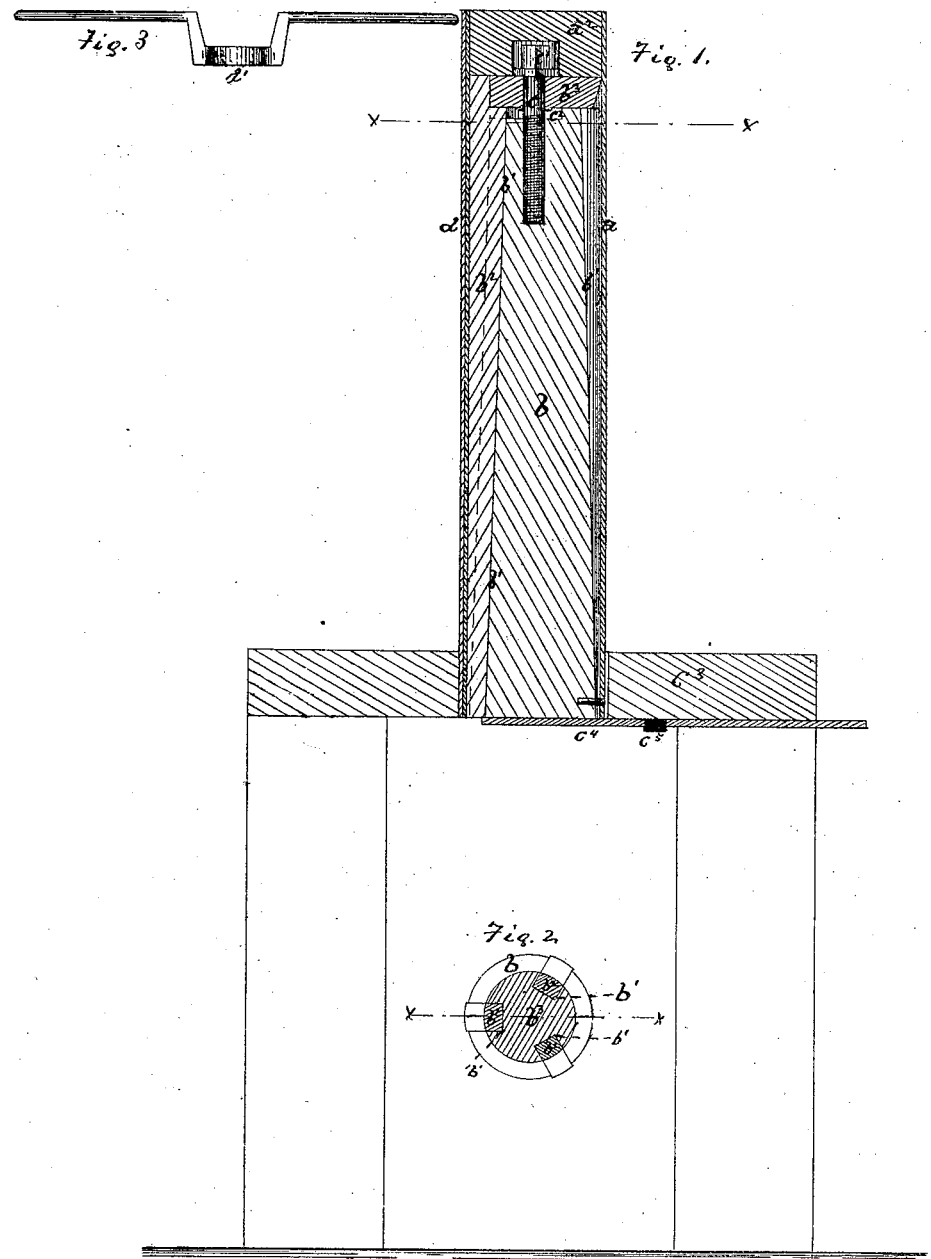

3 Sheets--Sheet 2.
P. McINTYRE.
Improvement in Molds for Clay and Cement Pipes.
No. 132,168. Patented Oct. 15, 1872.
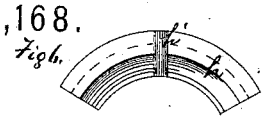
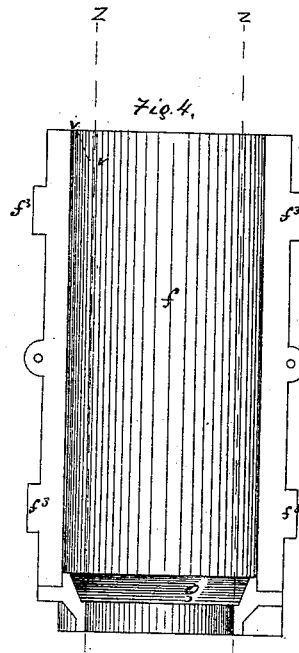
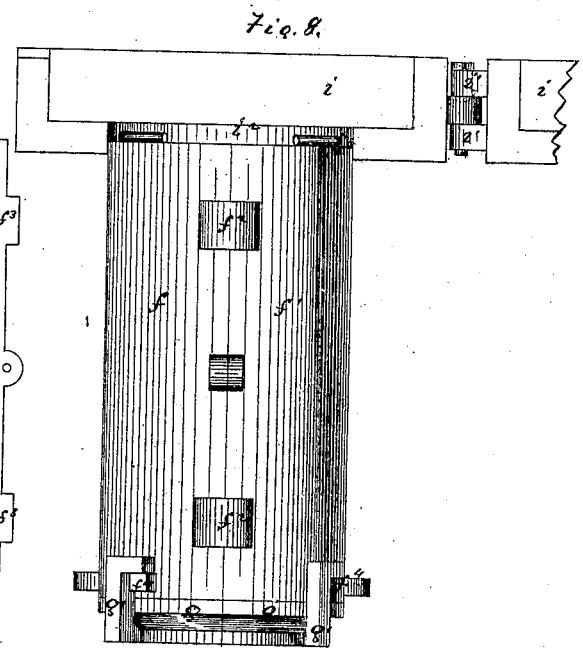
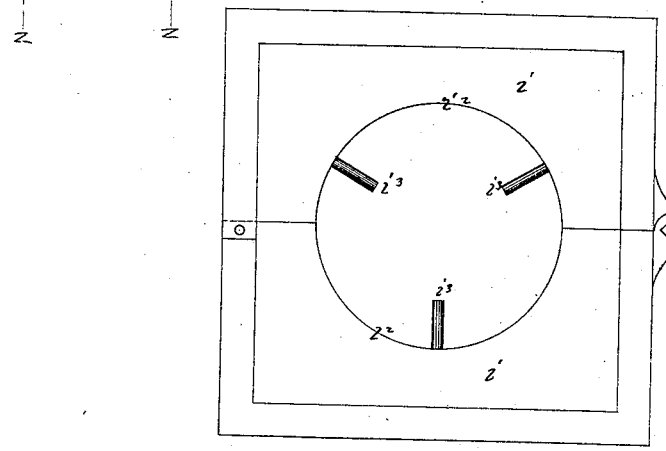
Witnesses.
Inventor.
Peter McIntyre
by W. E. Simonds
Solicitor P. McINTYRE.
Improvement in Molds for Clay and Cement Pipes.
No. 132,168. Patented Oct. 15, 1872.
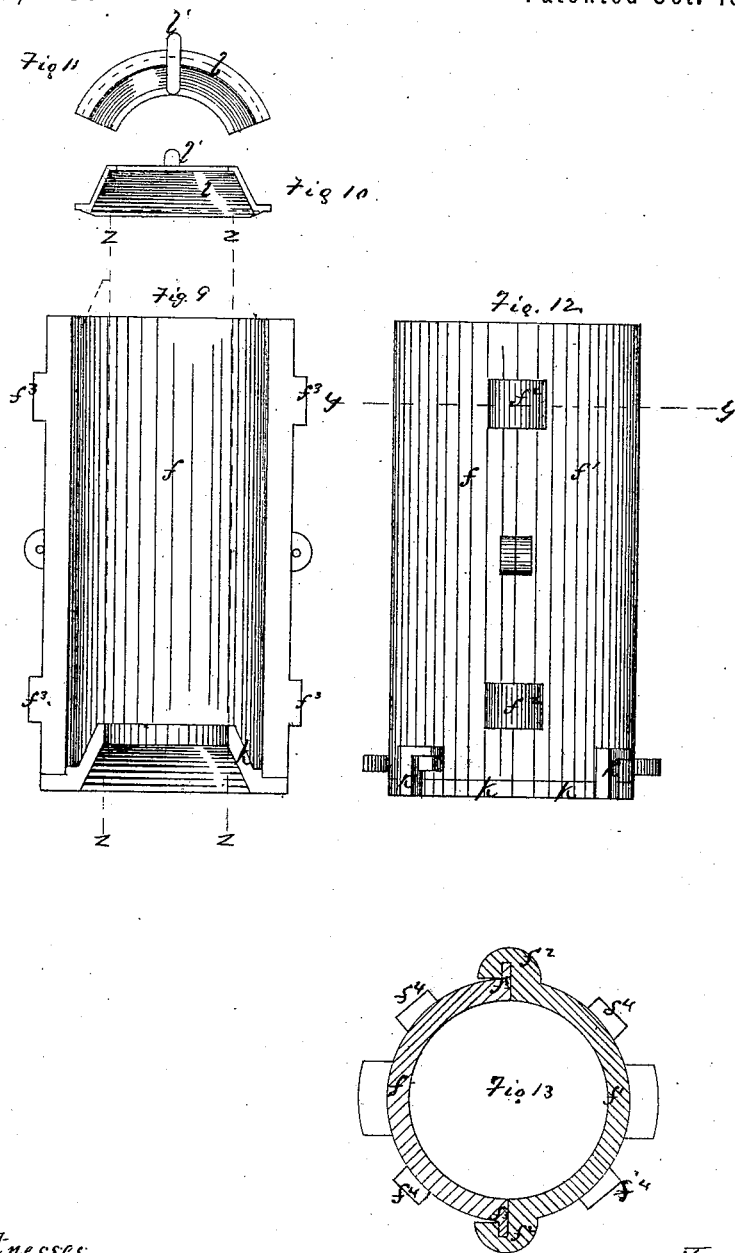

UNITED STATES PATENT OFFICE.

PETER McINTYRE, OF HARTFORD, CONNECTICUT, ASSIGNOR TO THE HARTFORD DRAIN-PIPE MACHINE COMPANY, OF SAME PLACE.

IMPROVEMENT IN MOLDS FOR CLAY AND CEMENT PIPES.

Specification forming part of Letters Patent No. 132,168, dated October 15, 1872.

*To all whom it may concern:*

Be it known that I, PETER MCINTYRE, of Hartford, in the county of Hartford and State of Connecticut, have invented certain new and useful Improvements in Apparatus for Making Earthen Pipe, of which the following is a specification, reference being had to the accompanying drawing, in which—

Figure 1 is a central vertical section of a central spring-core for forming the interior of the pipe and the table supporting it; Fig. 2 is a transverse horizontal section of the core shown in Fig. 1, through the dotted line $x\ x$; Fig. 3 is a side view of the wrench used for turning the screw seen at or near the top of the core in Fig. 1; Fig. 4 is a view of the inside of one of the halves of the case which forms the exterior of the pipe, with an attachment at the lower end for forming the male end of the pipe with so-called V-shaped ends; Fig. 5 is side view, from the inside of its circle, of a parti-circular trowel for forming and smoothing off the upper end of the pipe, formed in a casing made of halves like that shown in Fig. 4, which upper end is the female end; Fig. 6 is a plan view of the trowel shown in Fig. 5; Fig. 7 is a plan view of a hopper for the as yet unmolded earth or other material of which pipes are to be formed, which sits upon the top of the casing, as shown in Fig. 8; Fig. 8 is an external view of a complete casing made of halves, the same as shown in Fig. 4, having the same attachments at the lower end and the hopper shown in Fig. 7, but in a different adjustment, resting on its upper end; Fig. 9 is a view of the same half-casing shown in Fig. 4, having on its lower end an attachment for forming the female end of the so-called V-shaped pipe; Fig. 10 is a side view, from the inside of its circle, of a parti-circular trowel for forming the upper end of a pipe formed in a casing composed of the halves and lower-end attachments shown in Fig. 9, which upper end is the male end; Fig. 11 is a plan view of the trowel shown in Fig. 10; Fig. 12 is an external view of a whole casing and lower-end attachments, the half of which is shown in Fig. 9; and Fig. 13 is a sectional view of the casing shown in Fig. 12 through the line $y\ y$.

The nature and purpose of the invention are indicated by the name hereinbefore given it. The parts shown and described are intended for use in making pipe of cement or other material adapted to the purpose. The purpose which I have specially in view is the making of drain and water pipe from a mixture of cement and sand, which is molded while the mixture is plastic, and then allowed to harden. For this purpose a core is inserted into the center of an exterior casing, and the space between the core and casing is filled with the plastic material which is pressed or compacted together in some convenient manner, as, for instance, by ramming.

A core of peculiar construction for this purpose is shown in section in Fig. 1. Its exterior form is cylindrical, and this exterior is formed of a sheet of elastic metal, as, for instance, properly-tempered sheet-steel, bent around into the form of a cylinder, allowing the edges of the sheet to lap. This cylindrical sheet of metal is indicated by the letter $a$, and this lap is indicated by two thicknesses of the same at the left-hand side of the drawing. Within the cylinder $a$ is the conical pillar $b$, having two or more, preferably three, longitudinal grooves, $b^1$, adown its sides, which tend to run out to the surface as they approach the bottom of the pillar $b$. In these grooves $b^1$ fit and lie corresponding wedges $b^2$, which are loosely dovetailed at their tops into the block $b^3$, these dovetails being deeper toward the center of the block $b^3$ than the thickness of the wedges $b^2$, so that these wedges may move in and out from the center of this block, as occasion may require. Through the block $b^3$ runs the screw $c$, having a head, $c^1$, just above the block, and a collar, $c^2$, just below it, and running down into the pillar $b$, by the turning of which screw the block $b^3$ and its attached wedges $b^2$ may be raised or lowered relatively to the pillar $b$, as desired. The spring of the cylinder $a$ is such as to make it press upon these wedges $b^2$. When these wedges are moved downward they, of course, at the same time move outward from the center and thus expand the cylinder $a$, and a reverse movement takes place when the wedges are moved upward. The head $c^1$ of the screw is square, and is turned by means of the wrench shown in Fig. 3. The letter $a^2$ indicates a cap placed in the top of the cylinder and readily removable therefrom to keep all dirt from getting into the interior of the cylinder; this cap is removed when it is desired to operate the screw $c$.

In using this core it is first adjusted to the proper size to form the interior of a pipe, and after the pipe has been molded upon it the cap $a^2$ is removed and the screw $c$ run up till the cylinder is smaller than the interior of the pipe just molded upon it, when it can be readily removed from either end of the pipe. I prefer to remove it from the lower end of the pipe, and for this purpose I provide a table, $c^3$, with a circular hole therein, in which fits the lower end of the core resting upon the lever $c^4$, which is pivoted at $c^5$ to the under side of the table. To let the core down through at the appropriate time, I swing the lever $c^4$ to one side so that it ceases to form a support for the base of the core, and then the core slips down through.

In Fig. 4 is seen one of the halves, $f$, of the cylindrical exterior casing which forms the exterior of the pipe. The other half, $f^1$, is precisely like this one. They are fastened together, when in use, by the hooks or clamps $f^2$ which are upon the half $f^1$, which slip down over the lugs or wings $f^3$ which are upon the half $f$. These parts are seen in Figs. 4, 8, 9, 12, and 13. The part $f^1$ is raised somewhat to disengage it from the part $f$. On the bottom ends of the halves of the casing, Figs. 4 and 8, are attached formers, or rather a former, in halves corresponding to the halves of the casing for forming the male end of the so-called V-shaped pipe. These halves of the former $g$ are attached to the halves of the casing by hooks $g'$, which are made to catch upon the lugs $f^4$ on the sides of the casing by a partial rotation of the former-halves $g$. The dotted lines $z\ z$ show the outline of the central core when in position for use. The female end of the pipe is formed at the upper end of the casing by means of the trowel $h$. The workman grasps this trowel by the handle $h'$ and runs it around the core, forming an end whose cross-section upon one side is denoted by the dotted line $v\ v$. The letters $i\ i$ denote the halves of a hopper hinged together at $i^1$, which fits upon the upper end of the casing, into which the plastic cement is placed preparatory to pushing it into the casing to form a pipe. It has an opening, $i^2$, in the center, which just fits upon the casing. From the sides of this opening project pins $i^3$ which rest upon the upper edge of the casing, and their ends just fit against the central core, thus serving to steady and laterally support the core.

In Figs. 9 and 12 are shown attachments $k$ for the lower end of the casing composing a former, in halves, for forming the female end of the pipe with so-called V-shaped ends. They are attached to the casing in precisely the same way as the halves of the former $g$. The letter $l$ indicates a trowel, which in this case is used to form the upper male end of the pipe in the same way that the trowel $h$ is used to form a female upper end. $l'$ is the handle. The letters $k'$ indicate hooks answering to the hooks $g'$ in Figs. 4 and 8.

I claim as my invention—

1. The spring-core, composed of the cylinder $a$, the conical pillar $b$, the wedges $b^2$, the block $b^3$, and the screw $c$, combined and operating substantially as described.

2. The combination of the cylinder $a$, the interior adjusting apparatus, and the cap $a^2$ for covering the interior apparatus.

3. The combination of the exterior casing with the former $k$ for forming the female end of the pipe when this former is made in halves and attached to the casing by hooks $k'$, substantially as described.

4. The hopper formed of the parts $i\ i$ hinged together substantially as described, and having the pins $i^3$, as described, for the purpose set forth.

Dated April 24, 1872.

PETER McINTYRE.

Witnesses:
WM. E. SIMONDS,
JOHN S. GRIDLEY.